G. B. CRIST.
FLOAT.
APPLICATION FILED MAR. 9, 1909.
1,026,203.
Patented May 14, 1912.
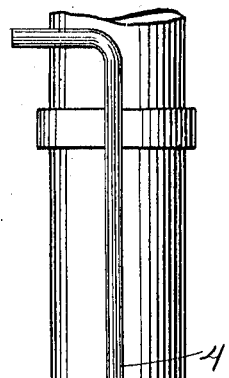
Fig. 1
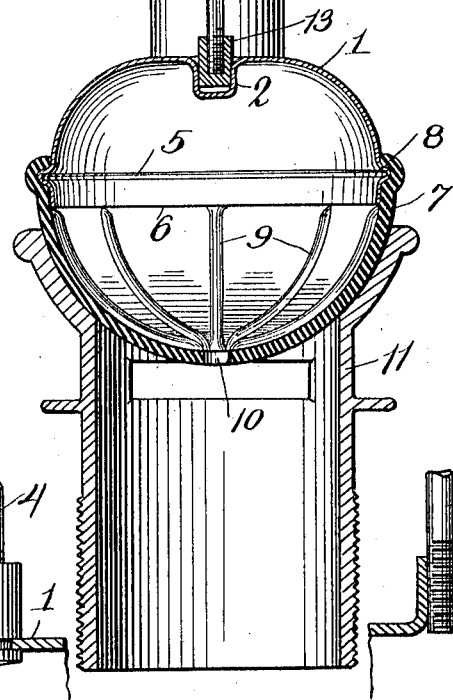
Fig. 2
Fig. 3
WITNESSES:
Ernest Miller
John F. Valentine
INVENTOR
George B Crist
BY
Chas. J. Corll
ATTORNEYS

UNITED STATES PATENT OFFICE.

GEORGE B. CRIST, OF MOHAWK, NEW YORK, ASSIGNOR, BY MESNE ASSIGNMENTS, TO AMERICAN PIN COMPANY, OF WATERBURY, CONNECTICUT, A CORPORATION OF CONNECTICUT.

FLOAT.

1,026,203.  Specification of Letters Patent.  Patented May 14, 1912.

Application filed March 9, 1909. Serial No. 482,261.

*To all whom it may concern:*

Be it known that I, GEORGE B. CRIST, a citizen of the United States of America, and resident of Mohawk, Herkimer county, State of New York, have invented certain new and useful Improvements in Floats, of which the following is a specification.

My invention relates to floats for controlling the discharge of water from cisterns such as are used in connection with water-closets.

The object of my invention is to provide a float for this purpose which shall be simple and effective in its construction and operation, one in which the part which is most likely to become defective through age or wear may be easily renewed, one which can be manufactured at less cost than those heretofore in use and one which shall be especially well adapted for handling and packing.

My invention consists in making a hollow float of two main parts; one part having the approximate general form of a hollow hemisphere made of metal, the other having the approximate form of a hollow hemisphere made of rubber or other suitable elastic material; in providing such parts with means whereby they may be readily secured together or separated from each other; in providing means for securing a guide rod to one of said parts; in providing means for stiffening the elastic part; and in other novel features of construction to be hereinafter more fully pointed out and described.

In the drawings accompanying and forming part of this specification, Figure 1 represents a sectional view through a float embodying one of the preferred forms of my invention; Fig. 2 represents a modified form of the securing means for the guide rod and Fig. 3 represents still another modified form of the means for securing the guide rod.

Heretofore it has been the practice to construct floats of this character entirely of rubber in the form of a hollow ball or sphere. Floats of this construction have been relatively expensive to manufacture because of the amount of rubber required and the difficulties attending the molding of rubber in the form of a complete hollow ball. They must be packed for shipment with great care in order that they may not become permanently distorted when they are allowed to stand for a long time before being used, they require relatively a great amount of space for packing, and moreover when the lower part of such floats, or that part which engages the float seat, becomes injured or worn out the entire float must be replaced.

In my improved float, the two parts being made separable may be stored, packed and shipped separately and they are of such form that they may be readily nested so as to occupy less space than when the two parts are permanently joined together.

Numeral 1 represents the upper main part of the float which is constructed of sheet metal. Its general form is that of a deep saucer or approximately that of a hollow hemisphere. It is provided with a recess 2 in which an internally threaded nut or nipple 3 is secured by being soldered thereto or threaded therein or in any other convenient manner. The guide rod 4 is in threaded engagement with the nut or nipple 3 and is of the usual form of the guide used with this class of floats. The top 1 is provided also with an externally projecting annular bead 5 formed near its outer rim 6. The elastic or lower part of the float 7 is formed of rubber or other suitable elastic material and is in the form of a dish or hollow hemisphere and it is provided with an internal groove 8 which is adapted to engage the bead 5 on the top 1. The bottom 7 is also provided with ribs 9 for the purpose of stiffening or strengthening this part. An opening 10 is formed in the lower side of the bottom 7.

Numeral 11 represents the float seat which may be of the usual form or construction.

In Fig. 2 I have shown a modification of the means for securing the guide rod 4 to the top 1. This consists of the shouldered nipple 12 which passes through an opening in the top 1 and is riveted thereto as shown.

In Fig. 3 I have shown still another modification of the means of securing the guide rod 4 to the top 1, which consists in forming a projection 13 in the top which projection is internally threaded to engage the threaded end of the guide rod 4.

Under normal conditions when the float rests upon the seat 11, it is covered with water. The purpose of the opening 10 in the bottom 7 is to drain off any water which might leak through between the bead 5 on the top and the groove 8 on the bottom.

While by means of this construction there is ordinarily no leakage, yet if through any defect there should be a small leak it will be of little consequence and will not affect the successful operation of the float because any water which leaks into the float may be readily drained off through the opening 10.

Having thus described my invention what I claim is:

1. In a float valve for controlling the discharge of water from tanks, a hemispherical shell made of elastic material and having an internal groove near its top, and reinforcing ribs formed on its inner surface converging downwardly toward the center of the shell, the upper ends of said ribs being spaced some distance below the internal groove whereby an unbroken seat is formed between the groove and the tops of the ribs.

2. In a float valve for controlling the discharge of water from tanks, the combination with a metallic shell having an externally projecting annular bead and a downwardly projecting flange of less diameter than said bead, of a hemispherical shell made of elastic material and having an annular internal groove, reinforcing ribs formed on its inner surface converging downwardly toward the center of the shell, the upper ends of said ribs being spaced below the said groove whereby an unbroken surface is formed between said groove and the top of said ribs; the bead of the upper shell being adapted to engage the groove of the lower shell while the depending flange of the upper shell engages the unbroken surface of the lower shell between said groove and the top of said ribs.

In testimony whereof, I have signed my name to this specification in the presence of two subscribing witnesses.

GEORGE B. CRIST.

Witnesses:
FLORENCE J. WALSH,
ERNEST MILLER.

---

Copies of this patent may be obtained for five cents each, by addressing the "Commissioner of Patents, Washington, D. C."